Aug. 28, 1962       N. MURPHY ET AL       3,050,906
METHOD OF MANUFACTURING MATCHING SHEETS OF GLASS
Filed March 21, 1960

Inventors
Norman Murphy
Carlo Ciceri
By
Morrison, Kennedy & Campbell
Attorneys 3,050,906
METHOD OF MANUFACTURING MATCHING
SHEETS OF GLASS
Norman Murphy, Roby, and Carlo Ciceri, St. Helens, England, assignors, by mesne assignments, to Glaces de Boussois, Paris, France, a French body corporate
Filed Mar. 21, 1960, Ser. No. 16,244
8 Claims. (Cl. 49—77)

In the manufacture of safety glass of the composite kind comprising two sheets of glass between which is interposed a transparent plastic layer, for example of polyvinyl butyral, by which the sheets are bonded together to form an integral whole, the optical quality of the safety glass generally speaking depends on the extent by which the two sheets match each other, that is depends on the conformity of the bonded faces of the laminar sheets one to the other. Where flat sheets are used, the bonded faces should be both plane and parallel to each other.

The sheets of glass used in making these composite assemblies are sometimes flat and sometimes curved, or both flat and curved, to suit the framework, as for example on a car body, into which they are destined to be fitted. The framework may be a windscreen frame, a back or side-light frame of a road vehicle. The profile of the sheets may be polygonal, curvilinear or have a continuous curved outline and in each shape there are opposed end peripheral sections between which are opposed lateral sections, that is to say on opposite sides of one diameter of a circle in the plane of the sheet, there are opposed end peripheral sections respectively and on opposite sides of the diameter of said circle at right angles to the first mentioned diameter, there are opposed lateral peripheral sections respectively.

The main object of the present invention is to provide an improved method of producing sheets which match for use in making a composite assembly type of safety glass.

Another main object is to produce thin matching sheets of glass suitable for use in pairs in making a laminated assembly.

In the manufacture of matching glass sheets according to the present invention a parent sheet is split in a plane parallel to its surfaces by both heating the parent sheet so as to permit it to suffer a thermal down shock and by forming a continuous score line around the perimeter of the parent sheet to define the plane of the split, and then progressively chilling the parent glass simultaneously on both faces to produce the desired thermal down shock in such manner that the down shock applied at the margin is 5 to 10° C. less than the down shock applied in the middle area, the chilling being effected by causing relative movement between the parent glass and chilling streams to propagate the split from one side to the other, the relative rate of movement between the glass and the chilling streams corresponding to the rate of propagation of the split. As a sheet of parent glass is treated by relative movement between the sheet and the means for heating and cooling, such as streams for heating and cooling, one of the end peripheral sections of the sheet becomes a leading peripheral section and the other end peripheral section of the sheet becomes a trailing peripheral section. In the case of a rectangular sheet, these end peripheral sections will constitute parallel leading and trailing edges respectively of the sheet, while the opposed lateral peripheral sections referred to above will constitute parallel side edges of the rectangular sheet.

The parent sheet may be subjected to a thermal treatment such that the margin of the sheet is at a temperature slightly less, for example 5° to 10° C. less, than in the middle area of the glass as a precedent to subjecting the glass to the prescribed thermal down shock.

By effecting the down shock at a time when a temperature differential exists along the margin of the sheet, the rate of splitting the margin is controlled as the split progresses to correspond with the rate of splitting in the middle area of the glass so that the split occurs along a straight line and the line of propagation of the split remains substantially parallel to its original direction and at right angles to the direction of development of the split to complete severance.

From another aspect the present invention comprises a method of manufacturing thin matching sheets of glass from a relatively thick sheet (¼-inch or 7 mm. thickness) and then splitting the parent glass in a plane parallel to its surfaces by selecting one peripheral section or edge (the leading edge) at which the split is to commence, by conditioning the glass for splitting by both heating the glass so that the lateral margins are at a temperature slightly less (5° to 10° C. less) than that in the body of the parent glass, and scoring the peripheral sections or edges of the glass in the said plane, then subjecting the parent glass to a thermal down shock to progressively propagate splitting of the glass in the said plane from the leading peripheral section or edge across the width of the parent glass.

The thermal down shock may be effected when the parent glass has been heated up to a temperature below the strain point of the glass, for example 500° C., or at a lower temperature, for example 150° C. However, applicants have discovered that a thermal down shock can be satisfactorily achieved at the unexpectedly low temperature of 90° C. A great advantage of splitting parent glass sheet in accordance with the invention at this temperature arises from the ease of handling and ease of thermally conditioning the glass to 90° C. where this is necessary.

Accordingly the present invention also comprises a method of manufacturing thin matching glass from a parent thick glass, for example ¼" or 7 mm. thickness, and splitting the parent glass into two matching sheets of ⅛" thickness when at a temperature in the region of 90° C.

From this aspect of the present invention the latter comprises a method of splitting a parent sheet of glass into two matching sheets from one peripheral section or edge (the leading edge) through a plane parallel to the surfaces of the parent glass, in which a sheet of glass at a temperature in the region of 90° C. throughout the main body and at slightly less (5° C. less) temperature at the lateral margins lying contiguous to the leading peripheral section or edge, the peripheral sections or edges of which sheet are scored for their respective lengths in the said plane to produce incipient lines of fracture, is simultaneously chilled over the two surfaces whereby the thermal down shock effected engenders the desired fracture in the said plane and creates two matching sheets from the parent sheet.

Applicants have discovered by experiment that when the temperature across the width of the glass is uniform at the time the thermal down shock is effected, there is a strong tendency for the propagation of the split to move faster at the lateral margins than in the middle area and that if the propagation of the split at the lateral margins gets too far in advance of that at the middle area, then the splitting may stop altogether.

Applicants have also established that if the line of propagation of the split continues as a straight line across the width of the sheet and progresses uniformly along the length of the sheet optimum conditions for a clean split in the middle plane obtain and that these conditions are present if the temperature of the lateral marginal areas of the glass is about 5° C. less than the temperature in the middle area when that is at about 90° C. and about 7° C. when the temperature at the middle area is at about 150° C.

One method of obtaining the temperature gradient in the lateral margins of the glass which meet the leading peripheral section or edge is when the glass is in a cool condition to heat the parent glass by applying an electric blanket or other suitable flexible covering, for example, a hollow blanket of rubber containing hot water, to the surfaces of the glass, which electric blankets are wired more intensely in the middle area than in the margins.

Alternatively if the glass is hot and the temperature is uniform across the full width of the glass the desired marginal temperature gradient can be produced by cooling the lateral margins, for example, by using jets of cooling water which are applied across the sheet as a fluid curtain, the curtain being of less intensity at the lateral margins.

From this aspect the present invention comprises a method of splitting a parent sheet of glass from one peripheral section or edge (the leading edge) through a plane parallel to the surfaces of the glass in which a sheet of glass at a temperature below the strain point of the glass, e.g. 500° C. (but preferably at the relatively low temperature of about 90° C.) throughout the main body and at slightly less (10° C. to 5° C. less respectively) temperature at the peripheral sections or edges lying contiguous to the leading peripheral section or edge, the peripheral sections or edges of which sheet are scored for their respective lengths in the same plane, is chilled simultaneously but progressively over the two surfaces, whereby the thermal down shock effected engenders the desired split in the said plane and creates two thin matching sheets from the parent thick sheet.

In order to achieve the marginal lower temperature as compared with the temperature of the main body of the sheet, a heated sheet may be either cooled to the desired operating temperatures, the peripheral sections or edges being cooled to a greater degree than the main areas of the sheet, or, if the sheet is below the desired temperature at which it is to be presented for the thermal down shock, the parent sheet may be heated up by a flexible covering adapted to impart slightly less heat over the marginal areas of the sheet contiguous to the leading peripheral section or edge.

In a modified method of carrying out the present invention the parent sheet may be heated on both faces simultaneously by opposed curtains of hot water of a width slightly less than that of the parent sheet.

As regards the controlled cooling of the conditioned sheet with the scored peripheral sections or edges, a sufficiently heated sheet may be progressively chilled by opposed curtains of cold water of a width slightly less than that of the parent sheet; thus the thermal down shock at the margins of the sheet is less than in the middle area of the sheet.

Alternatively the sheet having its peripheral sections or edges scored in the intended plane of the split may be passaged as a continuous process between curtains of a heating liquid, preferably water, and of the chilling liquid, for example water, the width of either the heating or chilling curtains being slightly less than that of the parent sheet, and then removed from the chilling liquid.

Preferably a suitable wetting agent is included in the water used to thermally condition or chill the parent glass.

In order that the invention may be more clearly understood preferred embodiments thereof, involving splitting a parent sheet of glass into two matching sheets, will now be described with reference to the accompanying diagrammatic drawings, in which.

In the drawings like references designate the same or similar parts.

The parent sheet of plate glass 1, from which it is intended to form matching sheets for use in making laminar assemblies, in accordance with the present invention, has opposed lateral peripheral sections shown as opposed lateral edges and opposed end peripheral sections between said lateral peripheral sections shown as end edges. The plate glass 1 shown has its edges scored by using a diamond or other suitable means, then the parent sheet is lowered into a furnace 2 until the glass is raised to the desired temperature in known manner, up to about 90° C., and then the glass is given a thermal down shock as it is raised from the furnace 2 to and through a chilling zone constituted between blowing frames 3 of the known form used for quenching glass in a toughening process, but the rate of propagation of a split at the lateral margins of the sheet which meet the leading edge (i.e. the top edge) of the sheet being raised) is held at the same rate as that in the main body by cooling the edge to a lesser degree than in the main body. Thus the rectangular blowing frames shown in FIGURE 1 are provided with nozzles 4 over a somewhat less width than that occupied by the sheet to be split, so that cooling streams are not applied to the margins contiguous to the leading edge, and thus a downshock of about 5° C. less than that at the middle area of the glass is obtained.

Figure 1:
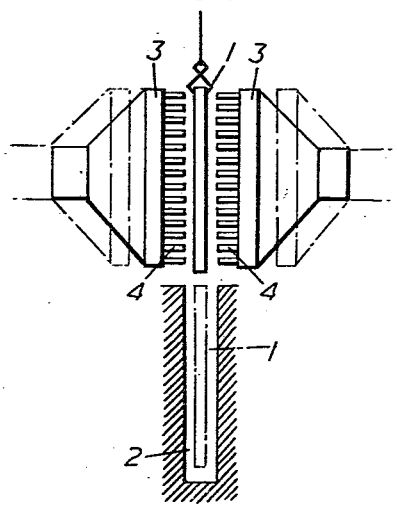
FIGURE 1 shows in side elevation cooling means for the parent glass.

In the arrangement shown in FIGURE 1 the blowing frames 3, 3 are first moved from the chain line (inoperative) positions to the full line (operative) positions and the glass is then hoisted up from the furnace into the chilling zone between the frames 3. From the moment the sheet 1 enters the chilling zone the chilling air is projected onto both faces of the glass from the nozzles 4 on the frames to effect progressive chilling of the glass from the leading edge as the sheet is advanced through the zone; thus chilling is effected at such a rate as to cause the sheet to split between the score lines. By cooling less on the lateral margins of the glass the rate of splitting at the lateral margins from the score lines corresponds to the rate in the middle area so that the line of split moves at a uniform rate in a straight line between the two marginal edges.

Experiments have shown that a ¼" sheet can be split into matching components at a linear speed of the glass through the chilling zone of 1 cm. per second.

Figure 2:
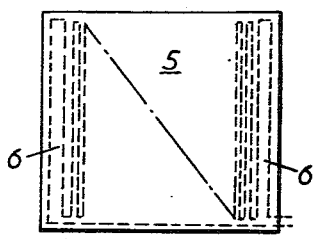
FIGURE 2 is a plan view of an electric blanket wired to obtain at the opposite edges, less heating effect than in the main body.

In FIGURE 2 is diagrammatically illustrated an electric blanket 5 which has less heating capacity at the sides 6 than in the middle area. The sheet 1 may be disposed between two such blankets before being transferred to a cooling zone, e.g. between cooling frames 3, 3. Thus the lateral margins of the sheet which are heated by sides 6 of the blanket to a lower tmeperature than the central portion are presented to the coolers and are cooled at the same rate as the central portion. Because of their lower temperatures, however, the lateral margins are subjected to a lesser thermal downshock than the central area so that the rate of propagation of the split is kept uniform right across the sheet, and the line of propagation of the split remains a straight line.

Figure 3:
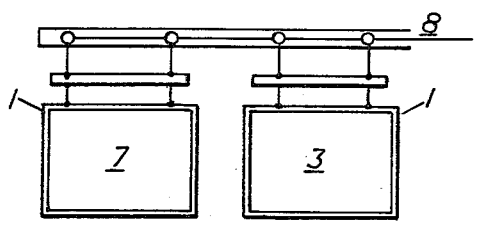
FIGURE 3 is a diagrammatic elevation showing means of traversing a parent sheet of glass between heating and cooling means.

In the arrangement shown in FIGURE 3, the glass 1 is disposed between spaced frames 7, 7 (of which one is shown in FIGURE 3) constructed similarly to the frames 3, 3 of FIGURE 1 but supplied with steam instead of air under pressure and when heated up to the desired temperature (e.g. 90° C.) are transferred by a conveyor system indicated at 8 to a position between frames 3, 3 where the thermal down shock is produced.

Individual sheets can, of course, be carried through heating and cooling zones on rollers arranged in a horizontal plane the zones being constituted by heating and cooling streams of water emanating from horizontally spaced apertured pipes connected to suitable sources of supply and lying wtih their axes parallel to the axes of the rollers but spaced apart vertically to permit passage of the horizontally disposed glass between them. Thus the glass travels between thermal curtains of water simultaneously directed toward both faces of the advancing sheet, during which travel the glass is first heated and then chilled. The streams preferably contain some suitable wetting agent, to ensure intimate and continuous association with the glass.

We claim:

1. The method of manufacturing matching glass sheets from a parent sheet of glass having substantially parallel opposed faces, a pair of opposed lateral peripheral sections and a pair of opposed end peripheral sections between said lateral peripheral sections, which method comprises scoring the perimeter of the parent sheet along said sections and in a region between said faces, and subjecting said parent sheet to thermal glass-splitting down shock by heating said parent sheet, chilling the parent sheet on both faces simultaneously thereacross between said lateral peripheral sections and progressively along said parent sheet from a leading peripheral section constituting one of said end sections to the opposite peripheral end section, while maintaining the thermal down shock at the margins of the parent sheet along said lateral peripheral sections between 5° to 10° C. less than the thermal down shock in the middle area of said parent sheet, to split said parent sheet thereacross between said lateral peripheral sections and progressively along said parent sheet from said leading peripheral end section, and controlling the rate of progression of chilling along the parent sheet from the leading peripheral end section at a rate corresponding to the rate of propagation of split along said parent sheet.

2. A method of manufacturing matching glass sheets from a parent sheet of glass according to claim 1, wherein said heating step is carried out differentially across the parent sheet to heat the margins of the parent sheet along said lateral peripheral sections to a temperature 5° to 10° C. less than in the middle area of the parent sheet, and wherein said chilling step is carried out substantially uniformly across the parent sheet between said lateral peripheral sections.

3. A method of manufacturing matching glass sheets from a parent sheet of glass according to claim 1, wherein said heating step is carried out differentially across the parent sheet to heat the main body of the parent sheet to a temperature of approximately 90° C. and the margins of the sheet along said lateral peripheral sections to a temperature 5° to 10° C. less, and wherein said chilling step is carried out substantially uniformly across the parent sheet between said lateral peripheral sections.

4. A method of manufacturing matching glass sheets from a parent sheet of glass according to claim 1, wherein said heating step is carried out differentially across the parent sheet by applying to each face of the parent sheet a flexible heating cover having sufficiently less heating capacity at the sides applied to the corresponding margins of the parent sheet along the corresponding lateral peripheral sections of the parent sheet than at the middle area of said cover to heat the margins of the parent sheet along said lateral peripheral sections to a temperature 5° to 10° C. less than in the middle area of the parent sheet.

5. A method of manufacturing matching glass sheets from a parent sheet of glass according to claim 1, wherein said heating step is carried out differentially across the parent sheet by applying simultaneously to both faces of the parent sheet opposed curtains of hot water having a width between the sides of the curtains extending along the lateral peripheral sections of the parent sheet less than that of the parent sheet between said lateral peripheral sections, under conditions to heat the margins of the parent sheet along said lateral peripheral sections to a temperature less than that in the middle area of the parent sheet.

6. A method of manufacturing matching glass sheets from a parent sheet of glass according to claim 1, wherein the progressive chilling step is carried out by applying simultaneously to both faces of the parent sheet opposed curtains of cold water having a width between the sides of the curtains extending along the lateral peripheral sections of the parent sheet less than that of the parent sheet between said lateral peripheral sections.

7. A method of manufacturing matching glass sheets from a parent sheet of glass according to claim 1, wherein said heating step across the parent sheet is carried out by applying simultaneously to both faces of the parent sheet opposed curtains of heating liquid while continuously passing the parent sheet edgewise between said curtains, and wherein said chilling step across the parent sheet is carried out by applying simultaneously to both faces of the parent sheet opposed curtains of chilling liquid while continuously passing the heated parent sheet between the latter curtains, and wherein one of said steps is carried out by confining the curtains for carrying out said one step to a width between the sides of the latter curtains extending along the lateral peripheral sections of the parent sheet less than that of the parent sheet between said lateral peripheral sections.

8. A method of manufacturing matching glass sheets from a parent sheet of glass according to claim 1, wherein said heating step is carried out by heating said parent sheet uniformly thereacross between said lateral peripheral sections, and said chilling step is carried out differentially by chilling the margins of the parent sheet along said lateral peripheral sections of the parent sheet less intensley than the middle area of the parent sheet under conditions to apply a thermal down shock to the margins of the parent sheet along said lateral peripheral sections between 5° to 10° C. less than the middle area of the parent sheet.

References Cited in the file of this patent

UNITED STATES PATENTS

| | | |
|---|---|---|
| 2,125,922 | Hopfield | Aug. 9, 1938 |
| 2,372,215 | McCormick | Mar. 27, 1945 |
| 2,378,091 | McCormick | June 12, 1945 |
| 2,584,851 | Dunipace | Feb. 5, 1952 |
| 2,884,312 | Kuryla | Apr. 28, 1959 |
| 2,887,806 | Hassett | May 26, 1959 |
| 2,959,507 | Long | Nov. 8, 1960 |

FOREIGN PATENTS

| | | |
|---|---|---|
| 70,086 | France | Oct. 13, 1958 |